United States Patent
Kim et al.

(10) Patent No.: US 11,314,570 B2
(45) Date of Patent: Apr. 26, 2022

(54) INTERNET-OF-THINGS-ASSOCIATED ELECTRONIC DEVICE AND CONTROL METHOD THEREFOR, AND COMPUTER-READABLE RECORDING MEDIUM

(71) Applicant: SAMSUNG ELECTRONICS CO., LTD., Suwon-si (KR)

(72) Inventors: Hahyoung Kim, Suwon-si (KR); Hawyong An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 16/957,306

(22) PCT Filed: Dec. 7, 2018

(86) PCT No.: PCT/KR2018/015519
§ 371 (c)(1),
(2) Date: Jun. 23, 2020

(87) PCT Pub. No.: WO2019/139259
PCT Pub. Date: Jul. 18, 2019

(65) Prior Publication Data
US 2020/0388406 A1  Dec. 10, 2020

(30) Foreign Application Priority Data
Jan. 15, 2018 (KR) .................... 10-2018-0005084

(51) Int. Cl.
G06F 11/07 (2006.01)
G16Y 40/10 (2020.01)
G16Y 40/20 (2020.01)

(52) U.S. Cl.
CPC ...... *G06F 11/0769* (2013.01); *G06F 11/0709* (2013.01); *G16Y 40/10* (2020.01); *G16Y 40/20* (2020.01)

(58) Field of Classification Search
CPC . G06F 11/0709; G06F 11/0769; G16Y 40/10; G16Y 40/20
See application file for complete search history.

(56) References Cited

U.S. PATENT DOCUMENTS 8,977,740 B2    3/2015  Sugaya
9,674,284 B2 *  6/2017  Ding ...................... H04W 4/70
(Continued)

FOREIGN PATENT DOCUMENTS

JP    2006-100951 A    4/2006
JP    2010-146437 A    7/2010
(Continued)

OTHER PUBLICATIONS

International Search Report dated Mar. 7, 2019 in corresponding International Patent Application No. PCT/KR2018/015519.
(Continued)

*Primary Examiner* — Joseph R Kudirka
(74) *Attorney, Agent, or Firm* — Staas & Halsey LLP

(57) ABSTRACT

An electronic device is disclosed. The present electronic device comprises: a communication unit; a memory for storing at least one command; and a processor for, by executing the at least one command, controlling the communication unit to transmit a control command for controlling an IoT device, and controlling the communication unit to acquire log information relating to a received response in relation to the control command and the transmission of the control command and transmit the acquired log information to an external device.

12 Claims, 13 Drawing Sheets

(56) References Cited

U.S. PATENT DOCUMENTS

| | | |
|---|---|---|
| 2015/0127814 A1 | 5/2015 | Hu et al. |
| 2015/0133082 A1 | 5/2015 | Broch et al. |
| 2015/0136873 A1 | 5/2015 | Stapleford et al. |
| 2015/0140933 A1 | 5/2015 | Muller et al. |
| 2015/0153061 A1 | 6/2015 | Heron et al. |
| 2015/0154028 A1 | 6/2015 | Chen |
| 2015/0154092 A1 | 6/2015 | Chen |
| 2015/0160708 A1 | 6/2015 | Mukherjee et al. |
| 2015/0172112 A1 | 6/2015 | Itkin et al. |
| 2015/0178664 A1 | 6/2015 | Neilan |
| 2015/0185007 A1 | 7/2015 | Brinton et al. |
| 2015/0205467 A1 | 7/2015 | Durante et al. |
| 2015/0205881 A1 | 7/2015 | Jain et al. |
| 2015/0215154 A1 | 7/2015 | Sakurai |
| 2015/0215343 A1 | 7/2015 | Itkin et al. |
| 2015/0218505 A1 | 8/2015 | Hedrick et al. |
| 2015/0229513 A1 | 8/2015 | Mangaiahgari et al. |
| 2015/0229774 A1 | 8/2015 | Mason et al. |
| 2015/0237502 A1 | 8/2015 | Schmidt et al. |
| 2015/0237551 A1 | 8/2015 | Jin et al. |
| 2015/0254784 A1 | 9/2015 | Richelson et al. |
| 2015/0254993 A1 | 9/2015 | Kang et al. |
| 2015/0256544 A1 | 9/2015 | Wu et al. |
| 2015/0256962 A1 | 9/2015 | Yang |
| 2015/0257229 A1 | 9/2015 | Wassel et al. |
| 2015/0278789 A1 | 10/2015 | Richelson et al. |
| 2015/0294288 A1 | 10/2015 | Richelson et al. |
| 2015/0295860 A1 | 10/2015 | Banerjee et al. |
| 2015/0301974 A1 | 10/2015 | Lin et al. |
| 2015/0302378 A1 | 10/2015 | Richelson et al. |
| 2015/0319151 A1 | 11/2015 | Chastain et al. |
| 2015/0319251 A1 | 11/2015 | Kim et al. |
| 2015/0319253 A1 | 11/2015 | Sun |
| 2015/0332203 A1 | 11/2015 | Johnson |
| 2015/0336594 A1 | 11/2015 | Yoon et al. |
| 2015/0346697 A1 | 12/2015 | Mailloux et al. |
| 2015/0346698 A1 | 12/2015 | Mailloux et al. |
| 2015/0347405 A1 | 12/2015 | Satoh |
| 2015/0350028 A1 | 12/2015 | Leinonen |
| 2015/0351185 A1 | 12/2015 | Correa et al. |
| 2015/0351336 A1 | 12/2015 | Gilbert et al. |
| 2015/0371032 A1 | 12/2015 | Puli et al. |
| 2015/0381384 A1 | 12/2015 | Visser et al. |
| 2015/0381769 A1 | 12/2015 | Yeh et al. |
| 2016/0006696 A1 | 1/2016 | Donley et al. |
| 2016/0020830 A1 | 1/2016 | Bell et al. |
| 2016/0021245 A1 | 1/2016 | Chmaytelli |
| 2016/0025072 A1 | 1/2016 | de Barros |
| 2016/0028783 A1 | 1/2016 | Durante et al. |
| 2016/0036650 A1 | 2/2016 | Brown et al. |
| 2016/0042314 A1 | 2/2016 | Mountz et al. |
| 2016/0043928 A1 | 2/2016 | Ordway et al. |
| 2016/0051177 A1 | 2/2016 | Chen |
| 2016/0057008 A1 | 2/2016 | Liu |
| 2016/0057127 A1 | 2/2016 | Chastain et al. |
| 2016/0057383 A1 | 2/2016 | Pattan et al. |
| 2016/0062440 A1 | 3/2016 | Gelonese et al. |
| 2016/0080287 A1 | 3/2016 | Mogul et al. |
| 2016/0087855 A1 | 3/2016 | Vlachogiannis et al. |
| 2016/0087997 A1 | 3/2016 | Chastain et al. |
| 2016/0089303 A1 | 3/2016 | Latorraca et al. |
| 2016/0099919 A1 | 4/2016 | Daniels et al. |
| 2016/0105698 A1 | 4/2016 | Tang |
| 2016/0112241 A1 | 4/2016 | Kaushik |
| 2016/0117558 A1 | 4/2016 | Porten et al. |
| 2016/0119075 A1 | 4/2016 | Gareau et al. |
| 2016/0134917 A1 | 5/2016 | Hardin |
| 2016/0142247 A1 | 5/2016 | Dumet et al. |
| 2016/0142890 A1 | 5/2016 | Drozdovskyy et al. |
| 2016/0149716 A1 | 5/2016 | Raj |
| 2016/0149874 A1 | 5/2016 | Sutherland et al. |
| 2016/0150019 A1 | 5/2016 | Klinkner et al. |
| 2016/0156501 A1 | 6/2016 | Hsu et al. |
| 2016/0164750 A1 | 6/2016 | Holkkola |
| 2016/0164881 A1 | 6/2016 | Bankowski et al. |
| 2016/0171568 A1 | 6/2016 | Cao et al. |
| 2016/0173447 A1 | 6/2016 | Achim et al. |
| 2016/0173511 A1 | 6/2016 | Bratspiess et al. |
| 2016/0176724 A1 | 6/2016 | Ji et al. |
| 2016/0179065 A1 | 6/2016 | Shahabdeen |
| 2016/0181808 A1 | 6/2016 | Besser et al. |
| 2016/0182295 A1 | 6/2016 | Jin et al. |
| 2016/0182487 A1 | 6/2016 | Zhu et al. |
| 2016/0182512 A1 | 6/2016 | Chastain et al. |
| 2016/0189095 A1 | 6/2016 | Richelson et al. |
| 2016/0203453 A1 | 7/2016 | Ito et al. |
| 2016/0205235 A1 | 7/2016 | Ricket |
| 2016/0205493 A1 | 7/2016 | Ricket |
| 2016/0217421 A1 | 7/2016 | Giera et al. |
| 2016/0218915 A1 | 7/2016 | Draper et al. |
| 2016/0232584 A1 | 8/2016 | Fenley |
| 2016/0232721 A1 | 8/2016 | Singh et al. |
| 2016/0234689 A1 | 8/2016 | Stan et al. |
| 2016/0240014 A1 | 8/2016 | Reddy et al. |
| 2016/0246746 A1 | 8/2016 | Tan et al. |
| 2016/0248620 A1 | 8/2016 | Itkin |
| 2016/0259953 A1 | 9/2016 | Shope et al. |
| 2016/0260313 A1 | 9/2016 | Thorpe et al. |
| 2016/0266637 A1 | 9/2016 | Butcher et al. |
| 2016/0269691 A1 | 9/2016 | Lee |
| 2016/0273181 A1 | 9/2016 | Smith |
| 2016/0283691 A1 | 9/2016 | Ali |
| 2016/0285493 A1 | 9/2016 | Veneroso |
| 2016/0285662 A1 | 9/2016 | Hardin |
| 2016/0291958 A1 | 10/2016 | Riedisser et al. |
| 2016/0294951 A1 | 10/2016 | Durrant et al. |
| 2016/0301992 A1 | 10/2016 | Barch et al. |
| 2016/0306329 A1 | 10/2016 | Gordon et al. |
| 2016/0306576 A1 | 10/2016 | Raskin et al. |
| 2016/0306634 A1 | 10/2016 | Zou et al. |
| 2016/0308972 A1 | 10/2016 | Ding et al. |
| 2016/0311703 A1 | 10/2016 | Benaissa et al. |
| 2016/0032801 A1 | 11/2016 | Cochran et al. |
| 2016/0034251 A1 | 11/2016 | Pani |
| 2016/0320942 A1 | 11/2016 | Liu et al. |
| 2016/0321714 A1 | 11/2016 | King et al. |
| 2016/0323111 A1 | 11/2016 | Chastain et al. |
| 2016/0328282 A1* | 11/2016 | Rogati .................. G06F 11/079 |
| 2016/0328682 A1 | 11/2016 | Alvarez |
| 2016/0330094 A1 | 11/2016 | Kniplitsch |
| 2016/0334799 A1 | 11/2016 | D'Andrea et al. |
| 2016/0341341 A1 | 11/2016 | Lin |
| 2016/0342762 A1 | 11/2016 | Goetz |
| 2016/0344194 A1 | 11/2016 | Arditi et al. |
| 2016/0348842 A1 | 12/2016 | Crouse |
| 2016/0349978 A1 | 12/2016 | Gonsalves et al. |
| 2016/0352653 A1 | 12/2016 | Ranganathan et al. |
| 2016/0357244 A1 | 12/2016 | Cudak et al. |
| 2016/0357959 A1 | 12/2016 | Dabbiere et al. |
| 2016/0357973 A1 | 12/2016 | Wang et al. |
| 2016/0359851 A1 | 12/2016 | Stuntebeck |
| 2016/0360713 A1 | 12/2016 | Wu et al. |
| 2016/0363337 A1 | 12/2016 | Steinberg et al. |
| 2016/0364665 A1 | 12/2016 | Hurst et al. |
| 2016/0366239 A1 | 12/2016 | Rabeela et al. |
| 2016/0370842 A1 | 12/2016 | Fitch et al. |
| 2016/0374494 A1 | 12/2016 | Geng |
| 2016/0380981 A1 | 12/2016 | Arora et al. |
| 2016/0381555 A1 | 12/2016 | Chastain et al. |
| 2017/0004808 A1 | 1/2017 | Agashe et al. |
| 2017/0006170 A1 | 1/2017 | Imai |
| 2017/0007458 A1 | 1/2017 | Huh |
| 2017/0026336 A1 | 1/2017 | Robitaille et al. |
| 2017/0026845 A1 | 1/2017 | Garg et al. |
| 2017/0031694 A1 | 2/2017 | Chu et al. |
| 2017/0031782 A1 | 2/2017 | Totten et al. |
| 2017/0038276 A1 | 2/2017 | Kemp et al. |
| 2017/0038277 A1 | 2/2017 | Kemp et al. |
| 2017/0038770 A1 | 2/2017 | Wurman et al. |
| 2017/0046228 A1 | 2/2017 | Palayur et al. |
| 2017/0048194 A1 | 2/2017 | Helms et al. |
| 2017/0064796 A1 | 3/2017 | Rumer et al. |
| 2017/0070579 A1 | 3/2017 | Dadu et al. |
| 2017/0075748 A1* | 3/2017 | Crosby ............... G06F 11/0709 |

(56) References Cited

U.S. PATENT DOCUMENTS

| | | |
|---|---|---|
| 2017/0078154 A1 | 3/2017 | Ansari et al. |
| 2017/0083854 A1 | 3/2017 | Elyea et al. |
| 2017/0083922 A1 | 3/2017 | Young et al. |
| 2017/0085649 A1 | 3/2017 | Ricket |
| 2017/0093516 A1 | 3/2017 | Marcoccia et al. |
| 2017/0093613 A1 | 3/2017 | Albrecht et al. |
| 2017/0096315 A1 | 4/2017 | Jackson |
| 2017/0098214 A1 | 4/2017 | Le Buhan et al. |
| 2017/0099138 A1 | 4/2017 | Albrecht et al. |
| 2017/0099366 A1 | 4/2017 | Albrecht et al. |
| 2017/0109381 A1 | 4/2017 | Mastronardi et al. |
| 2017/0118609 A1 | 4/2017 | Rodoni |
| 2017/0126504 A1 | 5/2017 | Fang et al. |
| 2017/0132900 A1 | 5/2017 | Lee et al. |
| 2017/0134228 A1 | 5/2017 | Velupillai |
| 2017/0134884 A1 | 5/2017 | Taborn |
| 2017/0142576 A1 | 5/2017 | Greaves et al. |
| 2017/0146287 A1 | 5/2017 | Rezayat |
| 2017/0155621 A1 | 6/2017 | Blair et al. |
| 2017/0157407 A1 | 6/2017 | Zellmer et al. |
| 2017/0160243 A1 | 6/2017 | Zhang et al. |
| 2017/0161087 A1 | 6/2017 | Runcie et al. |
| 2017/0161721 A1 | 6/2017 | Han et al. |
| 2017/0168730 A1 | 6/2017 | Chiu et al. |
| 2017/0177060 A1 | 6/2017 | Fang |
| 2017/0177873 A1 | 6/2017 | Raghuram et al. |
| 2017/0178101 A1 | 6/2017 | Getio et al. |
| 2017/0180314 A1 | 6/2017 | Walker et al. |
| 2017/0180341 A1 | 6/2017 | Walker et al. |
| 2017/0180366 A1 | 6/2017 | Chastain et al. |
| 2017/0180959 A1 | 6/2017 | Kim |
| 2017/0187643 A1 | 6/2017 | Alger et al. |
| 2017/0187808 A1 | 6/2017 | Redgate |
| 2017/0201543 A1 | 7/2017 | Terry |
| 2017/0214882 A1 | 7/2017 | Burns et al. |
| 2017/0222874 A1 | 8/2017 | Rodrigues |
| 2017/0223398 A1 | 8/2017 | Straub et al. |
| 2017/0223628 A1 | 8/2017 | Snyder et al. |
| 2017/0230421 A1 | 8/2017 | Touboul |
| 2017/0238240 A1 | 8/2017 | Gunasekara |
| 2017/0242466 A1 | 8/2017 | Gelonese et al. |
| 2017/0242553 A1 | 8/2017 | Dey et al. |
| 2017/0242711 A1 | 8/2017 | Dey et al. |
| 2017/0244909 A1 | 8/2017 | Dannen |
| 2017/0245104 A1 | 8/2017 | Klimek et al. |
| 2017/0245150 A1 | 8/2017 | Wang et al. |
| 2017/0249477 A1 | 8/2017 | Necas et al. |
| 2017/0250995 A1 | 8/2017 | Langton et al. |
| 2017/0257463 A1 | 9/2017 | Xie et al. |
| 2018/0285234 A1* | 10/2018 | Degaonkar ........... G06F 11/079 |

FOREIGN PATENT DOCUMENTS

| | | |
|---|---|---|
| JP | 2017-084296 | 5/2017 |
| KR | 10-0541635 B1 | 1/2006 |
| KR | 10-2009-0034433 A | 4/2009 |
| KR | 10-2014-0017050 | 2/2014 |
| KR | 10-1360097 B1 | 2/2014 |
| KR | 10-2013-0063866 | 6/2019 |

OTHER PUBLICATIONS

Written Opinion of the International Searching Authority dated Mar. 7, 2019 in corresponding International Patent Application No. PCT/KR2018/015519.

* cited by examiner

INTERNET-OF-THINGS-ASSOCIATED ELECTRONIC DEVICE AND CONTROL METHOD THEREFOR, AND COMPUTER-READABLE RECORDING MEDIUM

CROSS-REFERENCE TO RELATED APPLICATIONS

This application is a U.S. National Stage Application which claims the benefit under 35 U.S.C. § 371 of International Patent Application No. PCT/KR2018/015519 filed on Dec. 7, 2018, which claims foreign priority benefit under 35 U.S.C. § 119 of Korean Patent Application No. 10-2018-0005084 filed on Jan. 15, 2018 in the Korean Intellectual Property Office, the contents of both of which are incorporated herein by reference.

BACKGROUND ART

Technical Field

The disclosure relates to an electronic device and a control method therefor, and a computer-readable recording medium, and more particularly, to an electronic device that is capable of identifying the cause of an operation error of an Internet of Things (IoT) device and a control method therefor, and a computer-readable recording medium.

Description of the Related Art

With the recent development of semiconductor technologies and wireless communication technologies, communication functions are included in various things and a networks is formed, and accordingly, objects can be controlled conveniently. Such a technology of including communication functions in things and connecting them with a network is referred to as Internet of Things (IoT), and it is being used widely in real life.

However, in controlling devices connected through a network, in case devices malfunctioned, at the device that input a control command, only the problem of the device could be identified, and the problem that occurred in the device that was the subject of control could not be identified. Accordingly, in case a device malfunctioned, the cause of the error could not be identified correctly, and this caused confusion for users and the service center. In particular, in case the device that was the subject of control was the device of another company, the service center of the device that input a control command could not solve the error, and accordingly, there was inconvenience for a user of having to contact several service centers. Also, in case a damage occurred to a user due to a malfunction of an IoT device, there was a problem that the subject of legal responsibility was not clear.

DETAILED DESCRIPTION OF THE INVENTION

Technical Problem

The disclosure was devised according to the aforementioned need, and the purpose of the disclosure is in providing an electronic device that is capable of identifying the cause of an operation error of an Internet of Things (IoT) device by using log information and a control method therefor, and a computer-readable recording medium.

Technical Solution

An electronic device according to an embodiment of the disclosure includes a communicator, a memory storing at least one command, and a processor configured to, by executing the at least one command, control the communicator to transmit a control command for controlling an IoT device, and control the communicator to acquire log information relating to transmission of the control command and a response received for the control command, and transmit the acquired log information to an external device.

In this case, the communicator may communicate with the IoT device through an IoT server, and the log information may include log information for a control command transmitted to the IoT server through the communicator, log information for the control command transmitted from the IoT server to the IoT device, log information for a response for the control command transmitted from the IoT device to the IoT server, and log information for the response received from the IoT server through the communicator.

In this case, the external device may include a remote control server or an external storage device, and the processor may, based on an operation error of the IoT device occurring, control the communicator to transmit the log information to the remote control server or the external storage device.

Meanwhile, the processor may, based on an operation error of the IoT device occurring, store the log information in the memory.

Meanwhile, the processor may, based on an operation error of the IoT device occurring, identify the device wherein the error occurred among the electronic device, the IoT server, and the IoT device based on the log information.

In this case, the processor may, based on receiving log information for the response from the IoT server, identify that an error occurred in the electronic device, and based on failing to receive log information for the response from the IoT server within a predetermined time after transmitting the control command, identify that an error occurred in the IoT device.

Meanwhile, the electronic device may further include a display, and the processor may control the display to display at least one of information on the device wherein the error occurred or information on a method to resolve the error.

Meanwhile, a method for controlling an electronic device according to an embodiment of the disclosure includes the steps of transmitting a control command for controlling an Internet of Things (IoT) device, receiving a response for the control command, acquiring log information relating to transmission of the control command and the response, and transmitting the acquired log information to an external device.

In this case, in the step of transmitting, the control command may be transmitted to the IoT device through the IoT server, and the log information may include log information for a control command transmitted from the electronic device to the IoT server, log information for the control command transmitted from the IoT server to the IoT device, log information for a response for the control command transmitted from the IoT device to the IoT server, and log information for the response received from the IoT server.

In this case, the external device may include a remote control server or an external storage device, and in the step of transmitting to the external device, based on an operation error of the IoT device occurring, the log information may be transmitted to the remote control server or the external storage device.

Meanwhile, the control method may further include the step of, based on an operation error of the IoT device occurring, storing the log information in the memory.

Meanwhile, the control method may further include the step of, based on an operation error of the IoT device occurring, identifying the device wherein the error occurred among the electronic device, the IoT server, and the IoT device based on the log information.

In this case, in the identifying step, based on receiving log information for the response from the IoT server, it may be identified that an error occurred in the electronic device, and based on failing to receive log information for the response from the IoT server within a predetermined time after transmitting the control command, it may be identified that an error occurred in the IoT device.

Meanwhile, the control method may further include the step of displaying at least one of information on the device wherein the error occurred or information on a method to resolve the error.

Meanwhile, in a computer-readable recording medium including a program for executing a method for controlling an electronic device according to an embodiment of the disclosure, the control method includes the steps of transmitting a control command for controlling an Internet of Things (IoT) device, receiving a response for the control command, acquiring log information relating to transmission of the control command and the response, and transmitting the acquired log information to an external device.

MODE FOR IMPLEMENTING THE INVENTION

Figure 1:
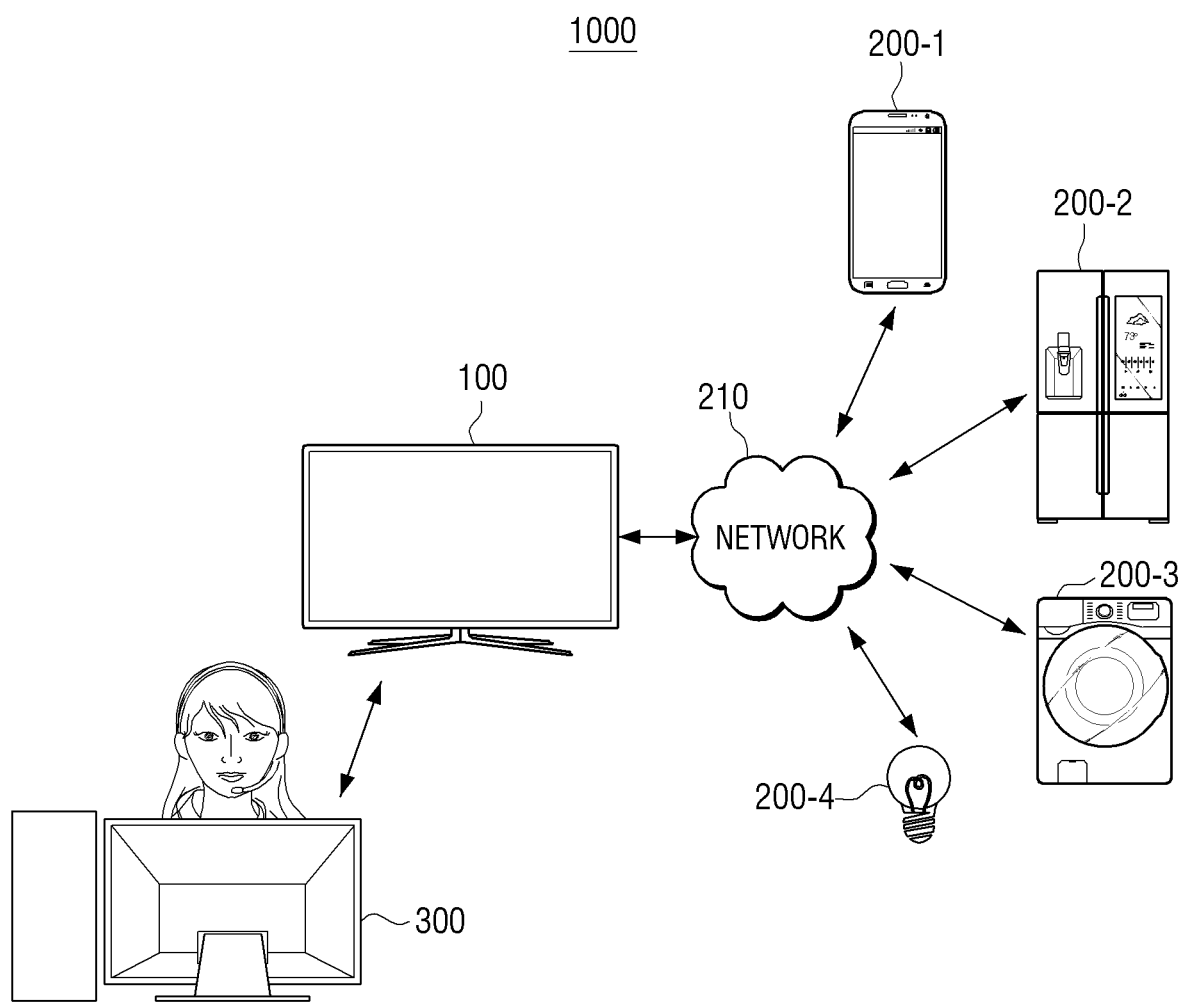
FIG. 1 is a diagram for illustrating a control system of an IoT device according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there are terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

In addition, terms such as "first," "second," and the like may be used to describe various elements, but the terms are not intended to limit the elements. Such terms are used only to distinguish one element from another element.

Meanwhile, singular expressions also include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not to exclude in advance the existence or possibility of adding one or more of other characteristics, numbers, steps, operations, elements, components, or a combination thereof.

Also, in the embodiments of the disclosure, 'a module' or 'a part' may perform at least one function or operation, and may be implemented as hardware or software, or as a combination of hardware and software. Further, a plurality of 'modules' or 'parts' may be integrated into at least one module and implemented as at least one processor, excluding 'a module' or 'a part' that needs to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, the disclosure will be described in more detail with reference to the drawings.

FIG. 1 is a diagram for illustrating a control system of an IoT device according to an embodiment of the disclosure.

Referring to FIG. 1, a control system 1000 of IoT devices includes an electronic device 100, a plurality of IoT devices 200-1 to 200-4 connected with the electronic device 100 through a network 210, and a remote control device 300.

The electronic device 100 may transmit a control command for controlling the IoT devices 200-1 to 200-4. Here, the electronic device 100 may be various kinds of devices including a display such as a TV, a mobile phone, a smartphone, a PDA, a laptop PC, a monitor, a tablet PC, an electronic book, an electronic photo frame, a kiosk, etc. In this case, the electronic device 100 may display a UI screen displayed for controlling the IoT devices 200-1 to 200-4 and a processed content. Meanwhile, the electronic device 100 may be various kinds of devices not including a display such as a server, a set-top box, etc. In this case, the electronic device 100 may transmit a UI screen and a processed content to another device including a display.

Meanwhile, although not illustrated in FIG. 1, the electronic device 100 includes a control box that exists separately from the electronic device 100 and is connected with the electronic device 100 through an optical cable. The control box may control the electronic device to display various screens, and may perform overall operations of the electronic device. For example, the control box may analyze a screen corresponding to an image signal received from an external device and transmit it to the electronic device 100. Also, the control box may generate a control command corresponding to a command input from a user through the electronic device 100, and transmit the generated control command to an external device. As described above, a separate control box exists, and thus peripheral devices may be connected with the control box and the control box may be conveniently connected with the electronic device 100 by a single line, without having to connect all peripheral devices with the electronic device 100 in a complex way. Accordingly, user convenience can be increased. Meanwhile, the control box may be referred to as a one connect (OC) box, an invisible box, etc., based on the aforementioned function.

The IoT devices 200-1 to 200-4 may be connected with the electronic device 100 through a network 210. Here, the network 210 may include an IoT server, and may be connected by a wireless method such as Wi-Fi and Bluetooth.

Specifically, the IoT devices 200-1 to 200-4 may receive a control command from the electronic device 100, and perform an operation corresponding to the received control command. Here, the IoT devices 200-1 to 200-4 may include a smartphone 200-1, a refrigerator 200-2, a washing machine 200-3, and a lamp 200-4. Also, although not illustrated, the IoT devices may further include a consent, a door lock, a boiler, a CCTV, an artificial intelligence speaker, a fire alarm, etc. in addition to the illustrated devices.

Meanwhile, the electronic device 100 may recognize the connected IoT devices 200-1 to 200-4 and construct them as a database (DB), and store the DB. Specifically, the electronic device 100 may recognize the manufacturer who manufactured the connected IoT devices 200-1 to 200-4, the product names of the IoT devices 200-1 to 200-4, applications and contents stored in the IoT devices 200-1 to 200-4, etc., and construct them as a database.

The database may be constructed in various ways. For example, a user may directly input information on the IoT devices 200-1 to 200-4 into the electronic device 100. Alternatively, according to other embodiments of the disclosure, the electronic device 100 may automatically recognize information on the IoT devices 200-1 to 200-4. For example, the electronic device 100 may acquire information on the IoT devices 200-1 to 200-4 from an image signal provided from the IoT devices 200-1 to 200-4. As an example, the electronic device 100 may acquire information on the IoT devices 200-1 to 200-4 by extracting the logo, the name of the manufacturer, applications, etc. from a screen corresponding to the image signal provided by the IoT devices 200-1 to 200-4.

The remote control device 300 may observe and control the electronic device 100 through a remote management (RM) server. Specifically, the remote control device 300 is used at the service center of the electronic device 100, and may identify the electronic device 100 through an ID input and remotely observe and control the operations of the electronic device 100. According to the disclosure, the electronic device 100 may control the IoT devices 200-1 to 200-4, and thus the remote control device 300 may control the IoT devices 200-1 to 200-4 through the electronic device 100. Here, with respect to provision of information of the electronic device 100, agreement of the user of the electronic device 100 may be required by priority.

In case an operation error of the IoT devices 200-1 to 200-4 occurs, the control system 1000 of IoT devices as illustrated in FIG. 1 may identify the cause of the error. Such an identifying operation will be described in detail with reference to the drawings below.

Figure 2:
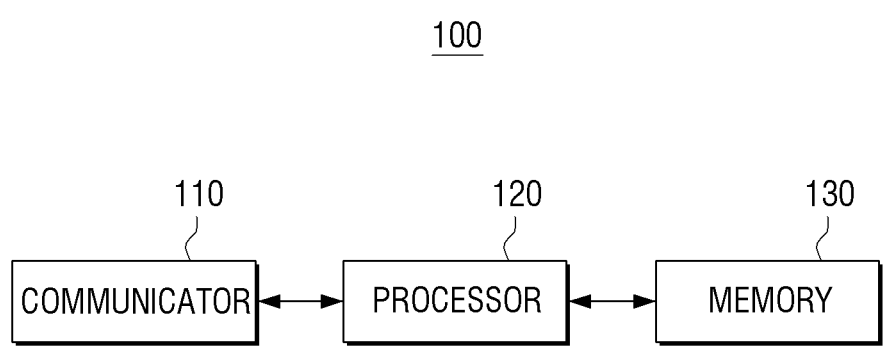
FIG. 2 is a block diagram illustrating a schematic configuration of an electronic device according to an embodiment of the disclosure.

FIG. 2 is a block diagram illustrating a schematic configuration of an electronic device according to an embodiment of the disclosure.

Referring to FIG. 2, the electronic device 100 includes a communicator 110, a processor 120, and a memory 130.

The communicator 110 is a component for performing communication with an external device. Specifically, the communicator 110 may perform communication with an IoT device. Here, the communicator 110 may perform communication with an IoT device through an IoT server.

Then, the communicator 110 may perform communication with a remote control device. Here, the communicator 110 may perform communication with a remote control device through an RM server. Specifically, in case a malfunction occurs in an operation of an IoT device and the user contacts the service center, and the remote control device of the service center attempts access to the electronic device 100, and the user agrees with the access, the electronic device 100 and the remote control device may be connected.

Also, the communicator 110 may perform communication with content providing sources such as the server of a broadcasting station providing contents to be displayed on the electronic device 100, a set top box, a game console, etc.

Meanwhile, the communicator 110 may communicate with an external device by a wired or wireless method.

Specifically, the communicator 110 may be connected with an external device by a wireless method such as a wireless LAN, Bluetooth, etc. In addition, the communicator 110 may be connected with an external device by using Wi-Fi, Zigbee, and infrared rays (IrDA). Meanwhile, the communicator 110 may include a connection port which is a wired method. Here, the communicator 110 may include a wired Ethernet, a high definition multimedia interface (HDMI) port, a component port, a PC port, a USB port, etc. In addition, the communicator 110 may include a digital visual interface (DVI), red green blue (RGB), a DSUB, a super video (S-Video), etc.

The processor 120 may control the overall operations and functions of the electronic device 100.

Specifically, the processor 120 may transmit a control command to an IoT device through the communicator 110, and receive a response for the control command. Then, the processor 120 may acquire log information based on the control command transmitted to the IoT device and the response thereto. Here, log information is information necessary for coping with obstacles that occur within a system that is being operated, and may include information on an IoT device, information on a function to be performed at the IoT device, information on whether the function was performed at the IoT device, information on the transmission and reception time of a command or a response, etc.

Specifically, log information may include at least one of log information for a control command transmitted to an IoT server through the communicator 110, log information for the control command transmitted from the IoT server to an IoT device, log information for a response for the control command transmitted from the IoT device to the IoT server, or log information that the electronic device 100 received from the IoT server. Such log information will be described in detail with reference to FIG. 8 below.

Then, the processor 120 may transmit the log information acquired in a communication process with an IoT device to an external device. Specifically, if an operation error of the IoT device occurs, the processor 120 may transmit the log information to an external device. Here, the external device may be a remote control device that can remotely control the electronic device 100. Meanwhile, the external device may be an external storage device that is a separate component from the electronic device 100. For example, the external storage device may be a USB device, an external hard device, an electronic device including a memory, etc.

Meanwhile, if the processor 120 is connected with a remote control device which is an external device, the processor 120 may transmit information on the screen that is currently being displayed on the electronic device 100 through the communicator 110.

Meanwhile, if the processor 120 receives a control command from a remote control device through the communicator 110, the processor 120 may perform an operation for the received control command.

The memory 130 may store various kinds of programs and data necessary for the operations of the electronic device 100. Specifically, in the memory 130, at least one command may be stored. The processor 120 may perform the aforementioned operation by executing the command stored in the memory 130.

Meanwhile, if an operation error of an IoT device occurs, the processor 120 may store log information in the memory 130.

Meanwhile, the aforementioned operation error of an IoT device may be identified by a user, or detected by a sensor (not shown) provided on the electronic device 100, etc. Specifically, if an IoT device which is a subject of control of a control command that a user input through the electronic device 100 does not perform a function corresponding to the control command, the user may determine that the IoT device does not operate normally, and attempt contact to the service center of the electronic device 100.

Meanwhile, if a response corresponding to a control command transmitted to an IoT server is not received, or an operation of a subject IoT device is not detected at a senor provided, etc., the processor 120 may determine that there is an error in the operation of the IoT device. Then, the processor 120 may identify whether the cause of the error is the electronic device 100 or the subject IoT device based on log information. Specifically, if an operation error of an IoT device is detected, the processor 120 may analyze log information and identify the device wherein the error occurred among the electronic device 100, the IoT server, and the IoT device. A process of analyzing log information and identifying the cause of an error will be described in detail with reference to FIG. 12 below.

As described above, in case an IoT device does not perform an operation corresponding to a control command, the cause of the error is identified by using log information, and accordingly, an effect of preventing confusion of a user and promoting fast restoration can be expected.

Figure 3:
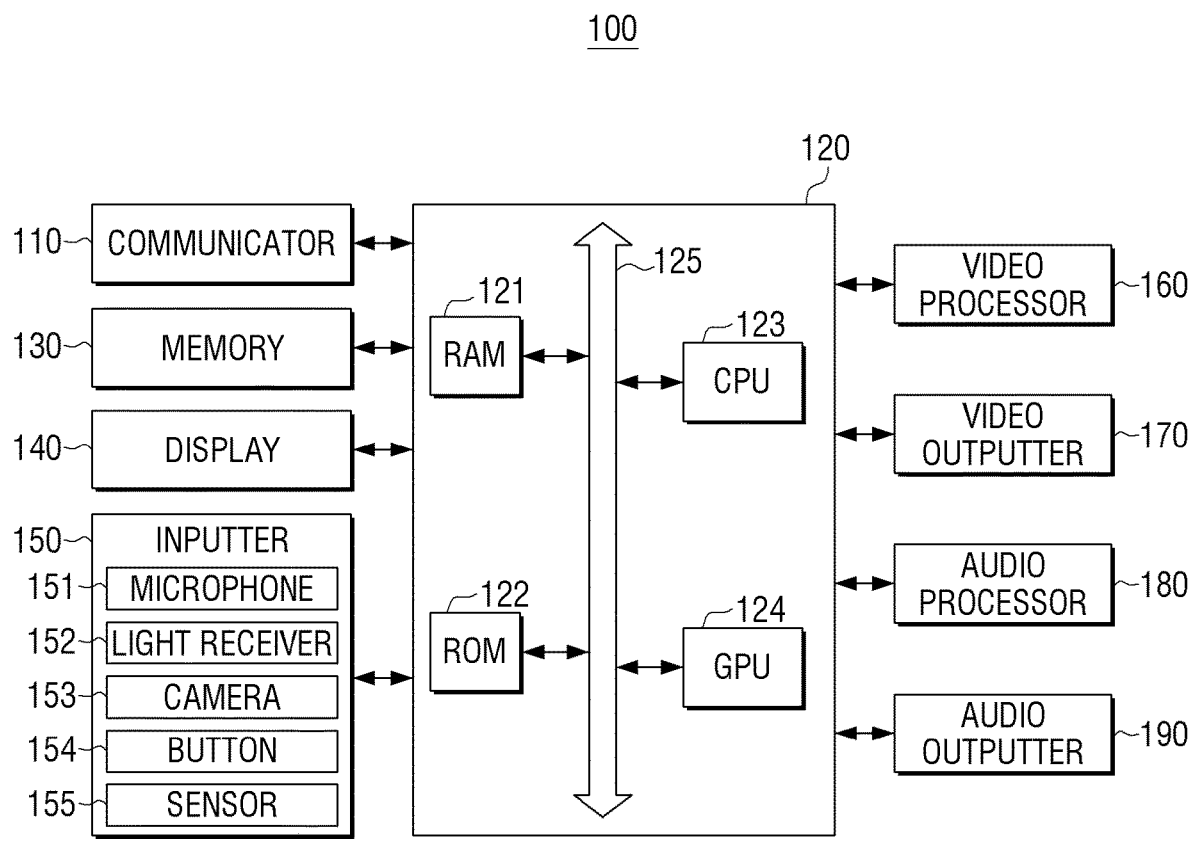
FIG. 3 is a block diagram illustrating a detailed configuration of the electronic device in FIG. 2.

FIG. 3 is a block diagram illustrating a detailed configuration of the electronic device in FIG. 2.

Referring to FIG. 3, the electronic device 100 may include a communicator 110, a processor 120, a memory 130, a display 140, an inputter 150, a video processor 160, a video outputter 170, an audio processor 180, and an audio outputter 190.

Here, as the operations of the communicator 110 and the memory 130 are identical to those of the components in FIG. 2, overlapping explanation will be omitted.

The processor 120 may include a RAM 121, a ROM 122, a CPU 123, a graphic processing unit (GPU) 124, and a bus 125. The RAM 121, the ROM 122, the CPU 123, and the graphic processing unit (GPU) 124 may be connected with one another through the bus 125.

The CPU 123 accesses the memory 130, and performs booting by using the O/S stored in the memory 130. Then, the CPU 123 performs various operations by using various kinds of programs, contents, data, etc. stored in the memory 130.

The ROM 122 stores a set of instructions, etc. for system booting. When a turn-on instruction is input and power is supplied, the CPU 123 copies the O/S stored in the memory 130 in the RAM 121 according to the instruction stored in the ROM 122, and boots the system by executing the O/S. When booting is completed, the CPU 123 copies the various types of programs stored in the memory 130 in the RAM 121, and performs various types of operations by executing the programs copied in the RAM 121.

When booting of the electronic device 100 is completed, the GPU 124 displays a UI on the display 140. Specifically, the GPU 124 may generate a screen including various objects like icons, images, and texts by using an operation part (not shown) and a rendering part (not shown). The operation part operates attribute values such as coordinate values, shapes, sizes, and colors by which each object will be displayed according to the layout of the screen. Also, the rendering part generates screens in various layouts including objects, based on the attribute values operated at the operation part. The screens (or user interface windows) generated at the rendering part are provided to the display 140, and are respectively displayed in a main display area and a sub display area.

In the above, it was described that the processor 120 includes only one CPU 123, but in implementing the disclosure, the CPU may be implemented as a plurality of CPUs (or DSPs, SoCs, etc.).

The display 140 is a component for displaying data. Specifically, the display 140 may be implemented as displays in various forms such as a liquid crystal display (LCD), an organic light emitting diodes (OLED) display, a plasma display panel (PDP), etc. In the display 140, driving circuits that may be implemented in forms such as an a-si TFT, a low temperature poly silicon (LTPS) TFT, and an organic TFT (OTFT), a backlight unit, etc. may also be included together. In addition, the display 140 may also be implemented as a flexible display.

Meanwhile, in the above, it was described that a displaying function and a gesture detecting function are performed in the same component, but the functions may be performed in different components. Also, depending on various embodiments, the display 140 may not be provided on the electronic device 100.

The processor 120 may control the display 140 to display an image corresponding to an image signal, a UI screen for controlling an IoT device, information on a device wherein an error occurred, information on a method to resolve the error, etc.

The inputter 150 is a component for receiving input of a user interaction such as a user voice, a user manipulation, etc. Also, the inputter 150 is a component that can detect an operation of an IoT device.

Specifically, the inputter 150 may include a microphone 151 that receives input of a user voice, a light receiver 152 that receives a light signal corresponding to a user input (e.g., a touch, a push, a touch gesture, a voice, or a motion) from a remote control device, a camera 153 that can generate an image for a user motion and the surrounding environment of the electronic device 100, a button 154 formed in any area such as the front surface part or the side surface part, the rear surface part, etc. of the exterior of the main body of the electronic device 100, a sensor 155 that can detect change in the surrounding environment of the electronic device 100, etc.

The button 154 may include buttons in various types such as a mechanical button, a touch pad, a wheel, etc. Also, the button 154 may be a component for receiving input of voice data and fingerprint data of a user. For example, a user may push a button for voice input on the electronic device 100 and input a voice, and here, in case a fingerprint recognition function exists on the surface of the button 154, the electronic device 100 may also receive input of a user fingerprint together. Such a button 154 may be provided on the electronic device 100, or provided on a remote control device communicating with the electronic device 100.

The sensor 155 may include at least one of an illumination sensor, a temperature sensor, an ultrasonic sensor, an infrared sensor, or a motion sensor. Specifically, if the sensor 155 is an ultrasonic sensor or an infrared sensor, the sensor 155 may detect an ultrasonic or infrared signal that is emitted in all directions from the electronic device 100 and is reflected on the boundary of a space and returns. Here, the processor 120 may measure the time between emission of an ultrasonic or infrared signal and detection of the reflected signal, and thereby determine change in the surrounding environment of the place wherein the electronic device 100 is located. Meanwhile, if the sensor 155 is an illumination sensor, the processor 120 may determine whether an operation of a lamp which is an IoT device was performed normally. Alternatively, if the sensor 155 is a temperature sensor, the processor 120 may determine whether a boiler or a fire alarm which is an IoT device operates normally.

Meanwhile, the sensor 155 may be an external sensor which is not provided on the electronic device 100, and the electronic device 100 may receive information on a sensed value from an external sensor through the communicator 110.

Meanwhile, although not illustrated, depending on embodiments, the inputter 150 may further include a touch screen for receiving input of a user touch, etc.

The video processor 160 is a component for processing video data included in a content received through the communicator 110, or in a content stored in the memory 130. At the video processor 160, various kinds of image processing such as decoding, scaling, noise filtering, frame rate conversion, resolution conversion, etc. of video data may be performed.

The video outputter 170 may output video data processed at the video processor 160. Here, in case the display 140 is provided on the electronic device 100, the video outputter 170 may be the same component as the display 140. However, in case the display 140 is not provided on the electronic device 100, or an image is to be displayed on an external display device, the video outputter 170 may be in the form of a port providing an image signal to an external display device.

The audio processor 180 is a component for processing audio data included in a content received through the communicator 110, or in a content stored in the memory 130. At the audio processor 180, various kinds of processing such as decoding or amplification, noise filtering, etc. of audio data may be performed.

When a playback application for a multimedia content is executed, the processor 120 may operate the video processor 160 and the audio processor 180, and play the content. Here, the display 140 may display an image frame generated at the video processor 160 in at least one area between the main display area and the sub display area.

The audio outputter 190 outputs audio data generated at the audio processor 180. Here, the audio outputter 190 may be a component that converts a voice signal into a sound and outputs the sound as a speaker provided on the electronic device 100, or it may be in the form of a port providing a voice signal to an external speaker.

In the above, it was described that the video outputter 170 and the audio outputter 190 are separate components, but in case the electronic device 100 includes an HDMI port transmitting a video signal and an audio signal simultaneously, the video outputter 170 and the audio outputter 190 may be physically implemented as one component.

Meanwhile, in the case of transmitting an image to an external display device through the aforementioned video outputter 170, the processor 120 may add a graphic user interface (GUI) to the image to be transmitted and transmit the image. Specifically, the processor 120 may transmit an image wherein a GUI was added to an image output at the video processor 160 to an external display device.

In addition, although not illustrated in FIG. 3, depending on embodiments, a USB port to which a USB connector can be connected, or an HDMI port, various external input ports for being connected with various external terminals such as a headset, a mouse, a LAN, etc., a DMB chip that receives a digital multimedia broadcasting (DMB) signal and processes the signal can obviously be further included in the electronic device 100.

Figure 4:
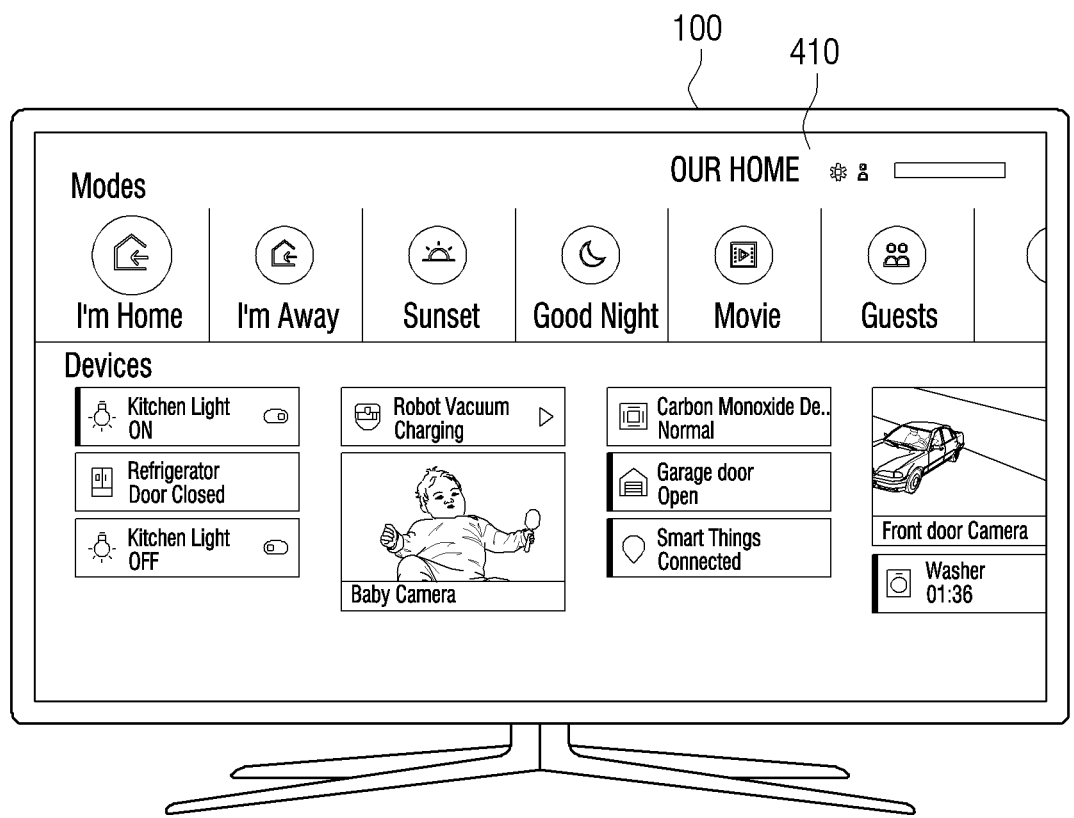
FIG. 4 is a diagram for illustrating a UI screen displayed on an electronic device for control of an IoT device.
Figure 5:
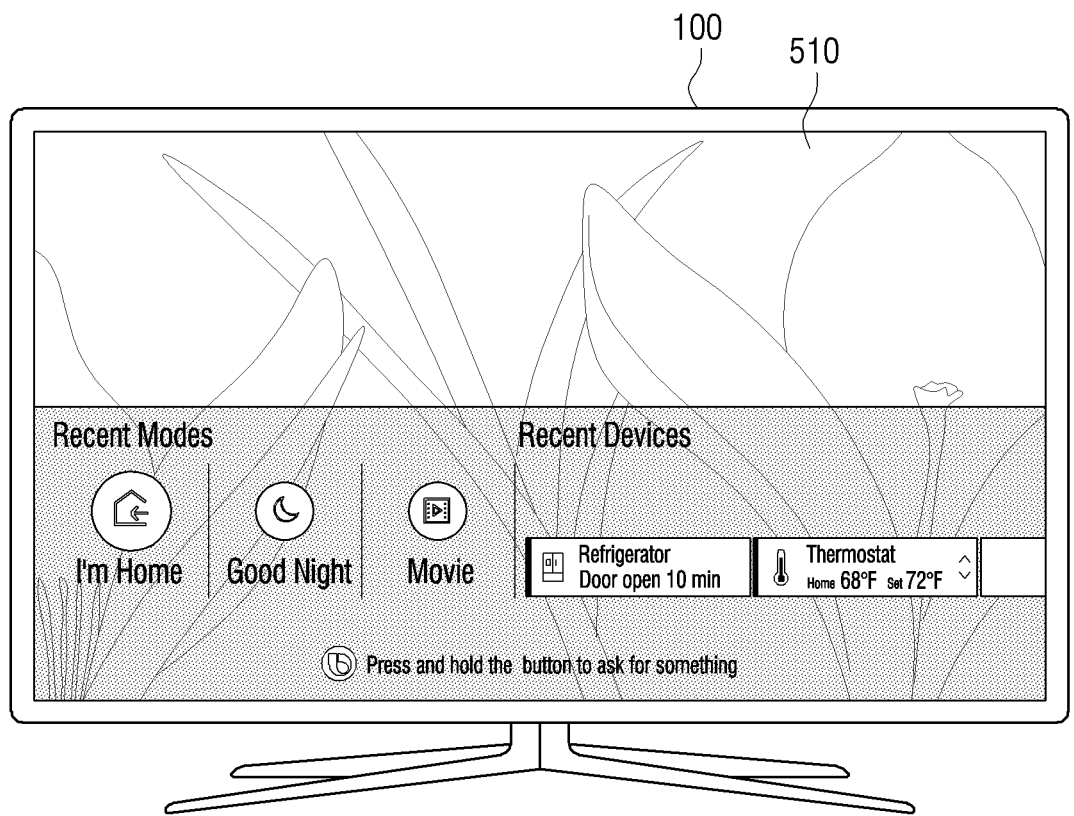
FIG. 5 is a diagram for illustrating a UI screen displayed on an electronic device for control of an IoT device.

FIGS. 4 and 5 are diagrams for illustrating a UI screen displayed on an electronic device for control of an IoT device.

Referring to FIG. 4, the electronic device 100 may display a UI screen 410 for controlling an IoT device in the form of a dashboard. A dashboard means a function of collectively managing various kinds of information and searching the information on one screen in an environment wherein the electronic device 100 is connected with a web. Specifically, a dashboard is constituted such that various kinds of web-based contents can be used, and documents, contents, control of an IoT device, etc. may be managed on one screen.

Specifically, if a user performs a predetermined operation such as pushing a menu button or a button for controlling an IoT device after pushing a TV power button or during a playback of a content, the UI screen 410 in the form of a dashboard may be displayed.

As described above, various contents and functions are collectively displayed on one screen and accordingly, a user can access a function to be executed more easily, and thus user convenience can be improved.

Meanwhile, as another example, as illustrated in FIG. 5, the electronic device 100 may display a UI screen 510 for controlling an IoT device in the form of an on screen display (OSD). Specifically, while a content is being played, if a user performs a predetermined operation such as pushing a menu button or a button for controlling an IoT device, the electronic device 100 may display a UI screen for controlling an IoT device in only a part of the screen wherein the content is displayed.

As described above, a control UI screen is displayed only in a part of the screen together with the present content, and thus control of an IoT device is possible without stoppage of viewing. Accordingly, user convenience can be improved.

Meanwhile, FIGS. 4 and 5 are for illustrating a UI screen for control of an IoT device at the electronic device 100 and are merely an embodiment, and the disclosure is not limited thereto.

Figure 6:
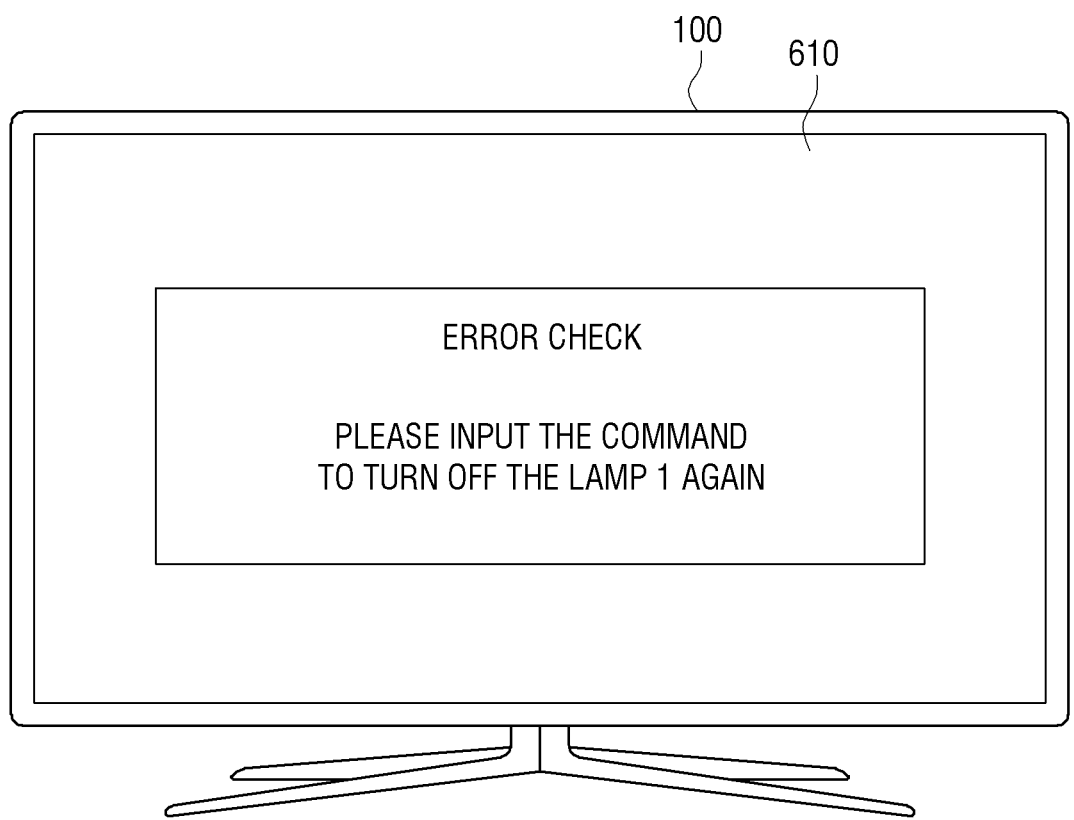
FIG. 6 is a diagram for illustrating a UI screen displayed on an electronic device in a process of detecting the cause of an error of an IoT device.

FIG. 6 is a diagram for illustrating a UI screen displayed on an electronic device in a process of detecting the cause of an error of an IoT device.

Specifically, the UI screen may be a UI screen 610 displayed for acquiring log information in case a user input a control command for an IoT device through the UI screen of the electronic device 100, but the subject IoT device does not operate normally.

Specifically, in case the electronic device 100 detects that an IoT device did not operate normally through a sensor provided, or a user identified that an IoT device did not operate normally and input a control commend into the electronic device 100 for checking the error, the electronic device 100 may display a UI screen 610 requesting to perform the same operation again. The user may see the UI screen 610 and input a control command for performing the same function again.

FIG. 6 illustrates an embodiment wherein a lamp among IoT devices did not perform an operation corresponding to a control command, but the disclosure is not limited thereto, and a UI screen requesting various control commands that can control IoT devices again may be displayed.

Figure 7:
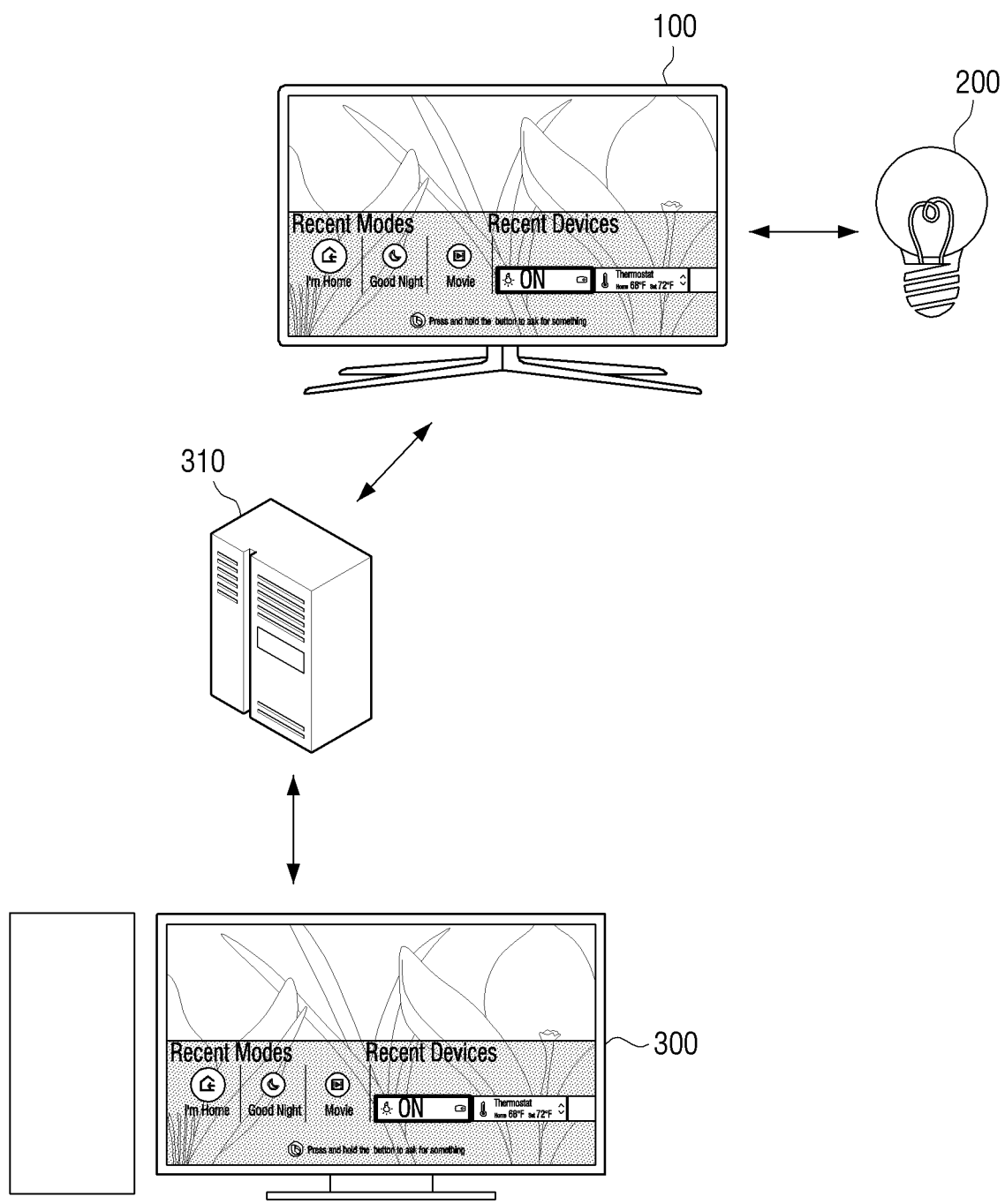
FIG. 7 is a diagram for illustrating an example of detecting the cause of an error of an IoT device by using remote control.

Meanwhile, in case a user identified an operation error of an IoT device, and connected to the service center, as illustrated in FIG. 7, the cause of the error may be detected by the remote control device 300 of the service center.

Referring to FIG. 7, in case an IoT device 200 connected with the electronic device 100 did not perform an operation corresponding to a control command, the remote control device 300 and the electronic device 100 may be connected according to a user request. Here, the electronic device 100 and the remote control device 300 may be connected through an RM server 310.

Here, the electronic device 100 may transmit the screen currently displayed to the remote control device 300 through the RM server 310, and if the service center selects an icon for turning on the lamp which is an IoT device 200 through the remote control device 300, the remote control device 300 may transmit a control command selecting the selected function to the electronic device 100.

The electronic device 100 may display that a function corresponding to the control command was selected according to the received control command on the screen, and transmit a control command corresponding to the selected function to the IoT device 200.

Figure 8:
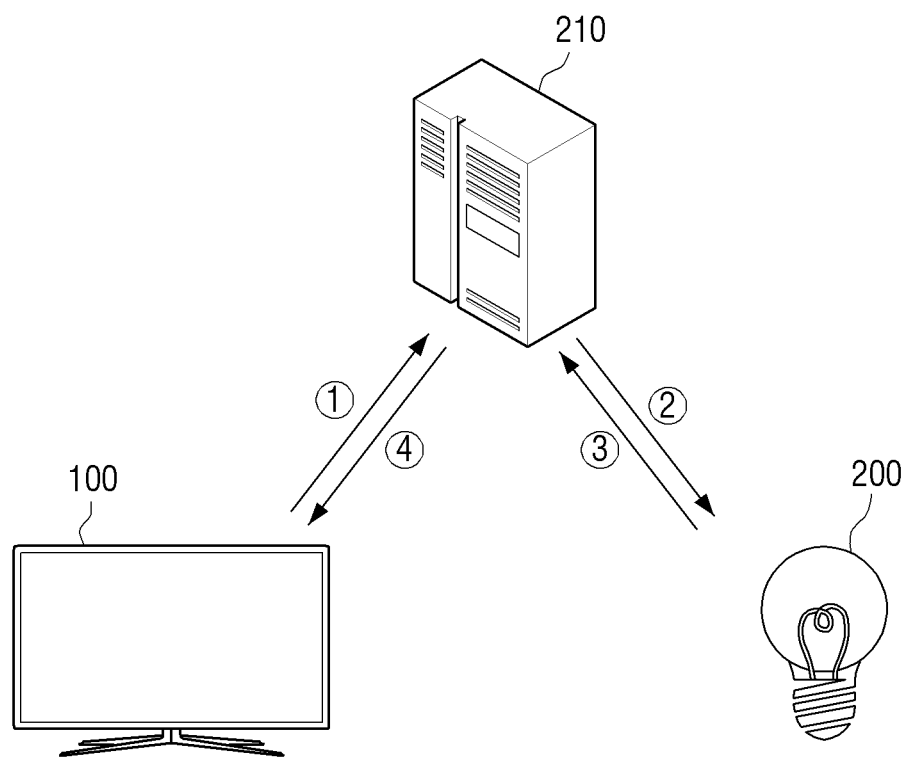
FIG. 8 is a diagram for illustrating log information generated according to transmission of a control command of an IoT device.

A control command may be transmitted as illustrated in FIG. 8 according to input of a control command by a user and a remote control device.

Referring to FIG. 8, a control command for the IoT device 200 input into the electronic device 100 may be transmitted to the IoT server 210 $\hat{1}$. Then, the IoT server 210 may transmit the received control command to the IoT device 200 which is the subject $\hat{2}$. Then, the IoT device 200 may transmit a response for the control command to the IoT server 210 $\hat{3}$. Then, the IoT server 210 may transmit the response received from the IoT device 200 to the electronic device 100 $\hat{4}$.

The electronic device 100 may acquire log information relating to the aforementioned transmission of the control command and reception of the response.

Here, in case the electronic device 100, the IoT server 210, and the IoT device 200 are connected normally, log information indicating that all of the operations $\hat{1}$ to $\hat{4}$ are performed normally may be acquired. In contrast, in case the IoT device does not operate normally, a response is not made, and thus log information indicating that there was an error in the operations $\hat{3}$ and $\hat{4}$ may be acquired.

The electronic device may analyze the acquired log information and identify the device wherein the error occurred. Detailed explanation in this regard will be made with reference to FIG. 9 below.

Figure 9:
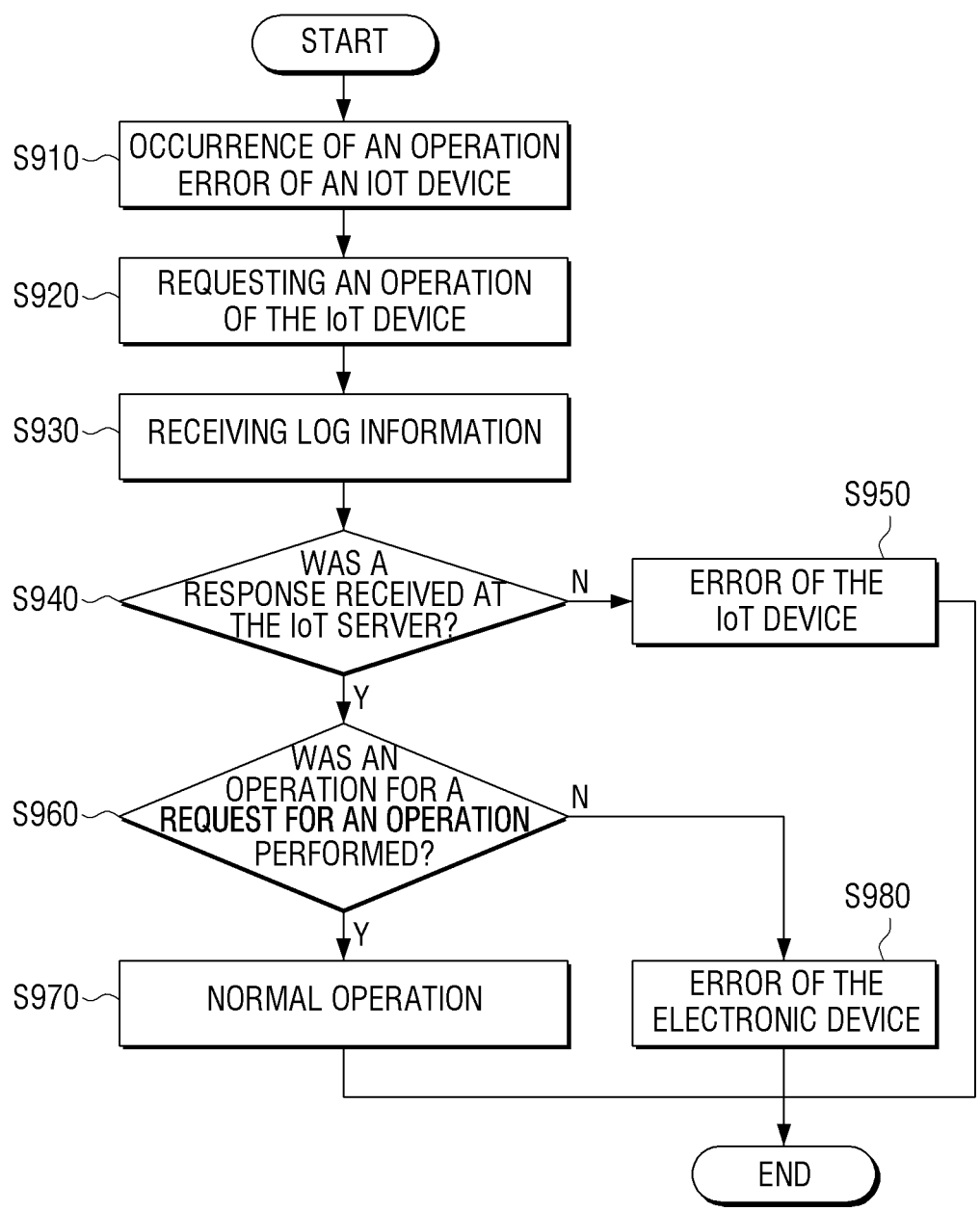
FIG. 9 is a flow chart for illustrating a method for identifying a device wherein an error occurred according to an embodiment of the disclosure.

FIG. 9 is a flow chart for illustrating a method for identifying a device wherein an error occurred according to an embodiment of the disclosure.

First, the electronic device may detect that an error occurred in an IoT device at operation 910. Specifically, if the electronic device detects that an error occurred in an IoT device by using a sensor provided, etc., or a user checked with the naked eye and input that an error occurred, the electronic device may identify that an error occurred.

Next, the electronic device may request an operation of the IoT device at operation S920. Specifically, if the electronic device detects occurrence of an error of the IoT device, the electronic device may request an operation of the IoT device by displaying a UI screen requesting input of the same control command to the user, or transmitting the control command wherein the error occurred to the IoT device again by itself. Alternatively, in case the user accessed the service center, the remote control device of the service center may request an operation of the IoT device by inputting a control command of the IoT device.

Then, the electronic device may receive log information at operation S930. Specifically, the electronic device may collect log information relating to transmission of the control command and a response thereto from the IoT server connected with the IoT device.

The cause of the operation error of the IoT device may be identified based on log information. Specifically, it may be identified whether a response was received at the IoT server based on log information at operation S940. Here, if a response was not received at the IoT server at operation S950-N, it may be identified that the operation error of the IoT device is the error of the IoT device itself at operation S950. This is due to the fact that, the reason that a response was not received while a control command was transmitted to the IoT server normally was that a response was not transmitted from the IoT device to the IoT server.

Meanwhile, if a response was received at the IoT server at operation S950-Y, it may be identified whether an operation for a request for an operation was performed at operation S960. If the IoT device performed an operation corresponding to a request for an operation at operation S960-Y, it may be identified that the IoT device operates normally. That is, it may be identified that a control system of IoT devices does not have a problem.

In contrast, if the IoT device did not perform an operation corresponding to a request for an operation at operation S960-N, it may be identified that the cause of the operation error of the IoT device is the error of the electronic device at operation S980. Specifically, in a state wherein it was identified that there is no problem in connection of the electronic device, the IoT server, and the IoT device by reception of a response, if the IoT device does not perform an operation corresponding to a control command, it is because the electronic device wrongly generated a control command to another IoT device, or the IoT server transmitted a control command to another IoT device.

The aforementioned operation of detecting the cause of an error may be performed at the electronic device, or performed at an RM server or a remote control device to which log information was transmitted.

Figure 10:
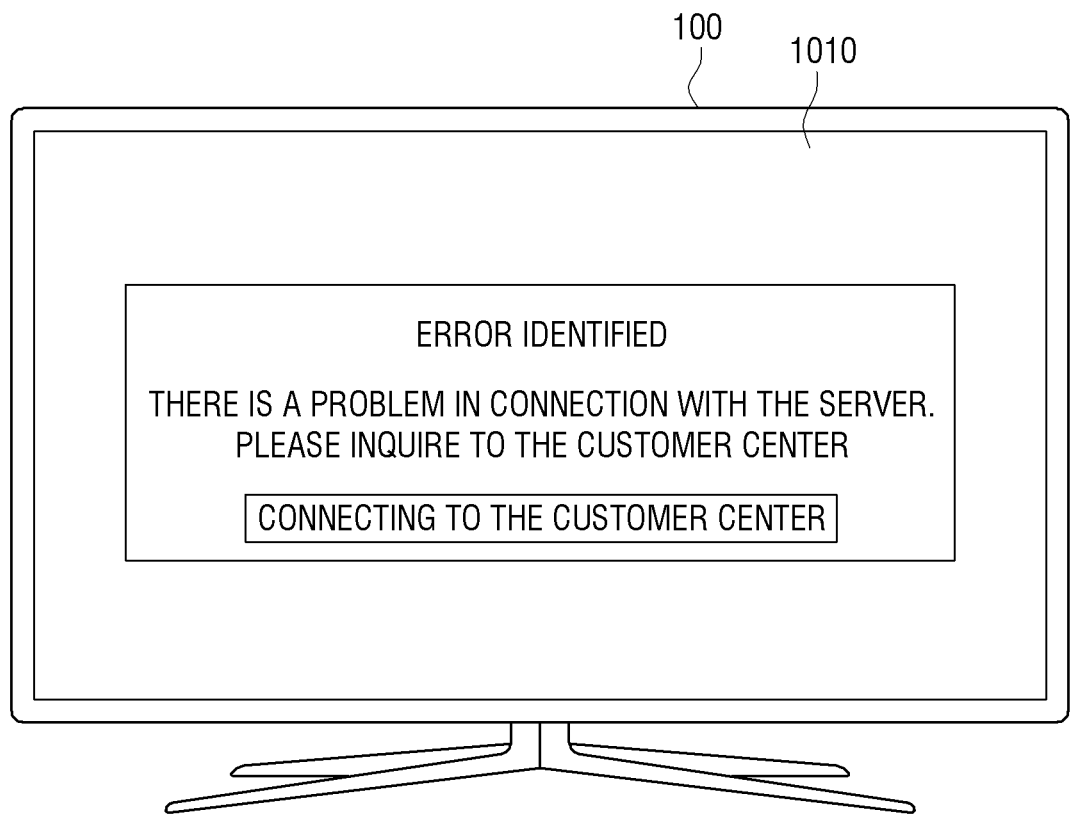
FIG. 10 is a diagram for illustrating a UI displayed to provide an error detection result.
Figure 11:
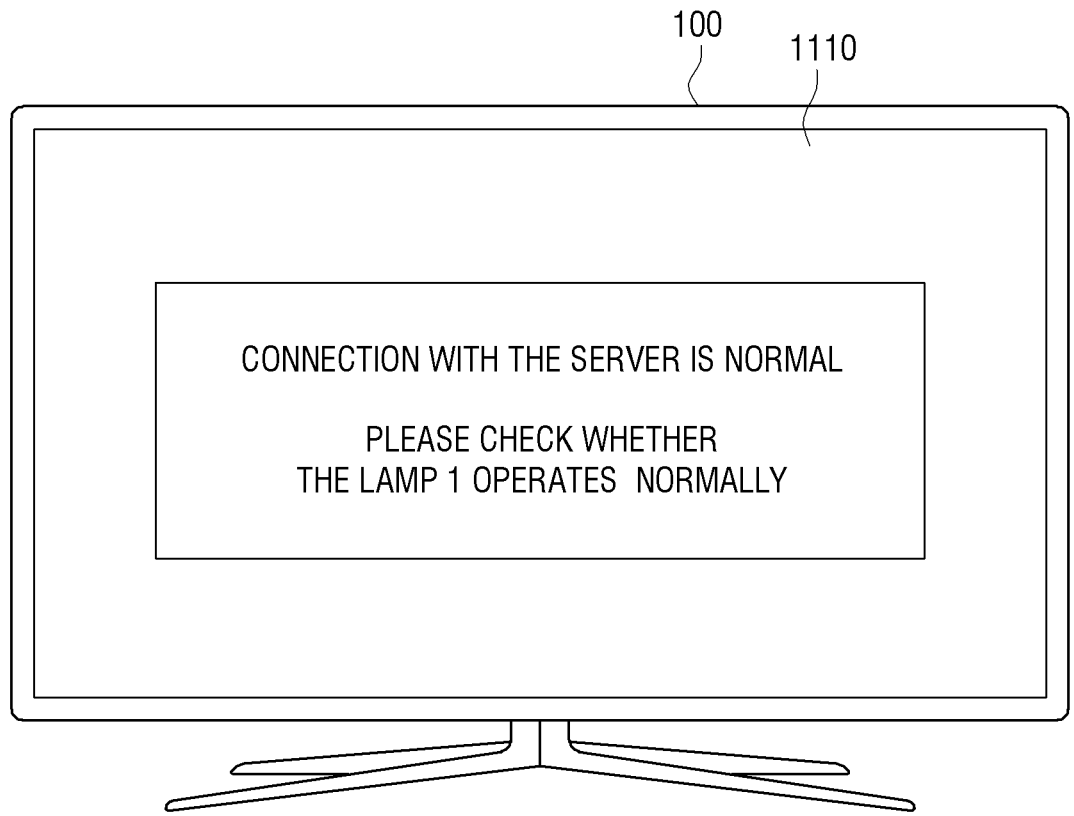
FIG. 11 is a diagram for illustrating a UI displayed to provide an error detection result.

FIGS. 10 and 11 are diagrams for illustrating a UI displayed to provide an error detection result.

Specifically, if the cause of an operation error of an IoT device is the problem of the electronic device 100 or the IoT server, the electronic device 100 may display a UI screen 1010 indicating that the cause is the problem of connection of the electronic device 100 or the IoT server as illustrated in FIG. 10. Here, in case the cause is the problem of the electronic device 100 or the IoT server, there is a need to be guided by the service center about a method to resolve the problem. Thus, the electronic device 100 may include a tab that enables connection to the service center on the UI screen.

In contrast, if the cause of the operation error of the IoT device is the problem of the IoT device itself, the electronic device 100 may display a UI screen 1110 indicating that the cause is the problem of the IoT device itself as illustrated in FIG. 11. In this case, the electronic device 100 may display a UI screen including a message requesting to a user to check the problem of the IoT device such as a case wherein the IoT device broke down, or power was turned off. Also, in case the IoT device is a product of another company, the electronic device 100 may display a UI screen including a message requesting to inquire to the another company.

Figure 12:
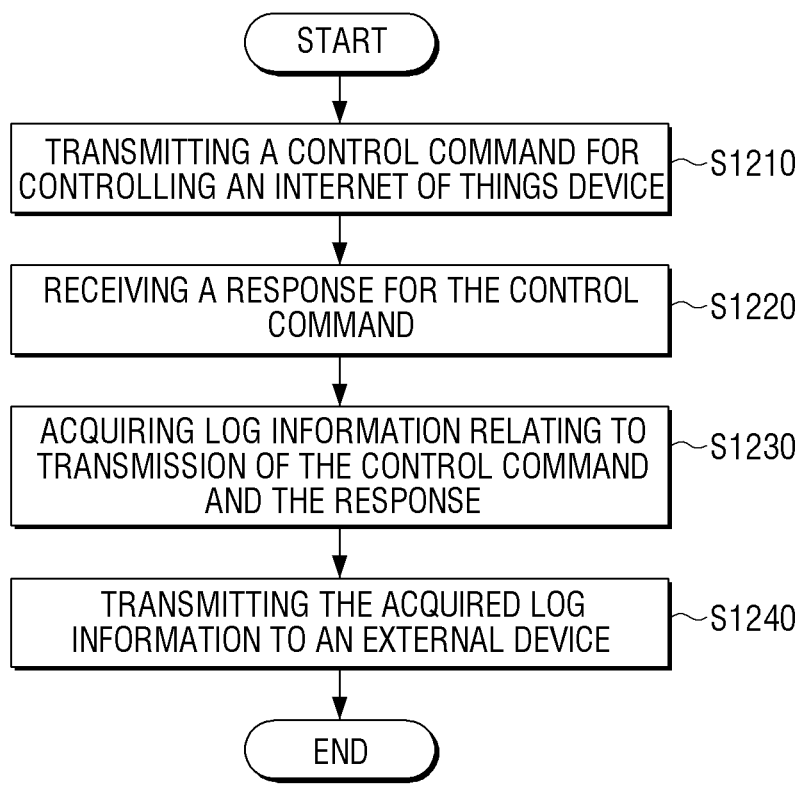
FIG. 12 is a flow chart for illustrating a method for controlling an electronic device according to an embodiment of the disclosure.

FIG. 12 is a flow chart for illustrating a method for controlling an electronic device according to an embodiment of the disclosure.

First, the electronic device may transmit a control command for controlling an Internet of Things device at operation S1210. Specifically, the electronic device may transmit a control command for controlling an IoT device to the IoT device. Here, the electronic device may transmit a control command to the IoT device through an IoT server.

Next, the electronic device may receive a response for the control command at operation S1220. Specifically, the electronic device may receive a response for a control command from the IoT server. Here, in case the IoT server did not receive a response from the IoT device, the IoT server may transmit a response that a response was not received to the electronic device.

Then, the electronic device may acquire log information relating to transmission of the control command and a response thereto at operation S1230. Specifically, the electronic device may acquire log information relating to a process of transmitting the control command and the response in the order of the electronic device→the IoT server→the IoT device→the IoT server→the electronic device as illustrated in FIG. 8. Meanwhile, even in a case wherein the electronic device did not receive a response from the IoT server within a predetermined time after transmitting the control command, the electronic device may acquire log information that a response was not received.

Then, the electronic device may transmit the acquired log information to an external device at operation S1240. Specifically, if an operation error of the IoT device occurs, the electronic device may transmit the acquired log information to an external remote control device or an external storage device. Meanwhile, although not illustrated, the electronic device may analyze the cause of the operation error of the IoT device by using the acquired log information. As the analysis process was already explained in FIG. 9, overlapping description will be omitted.

Figure 13:
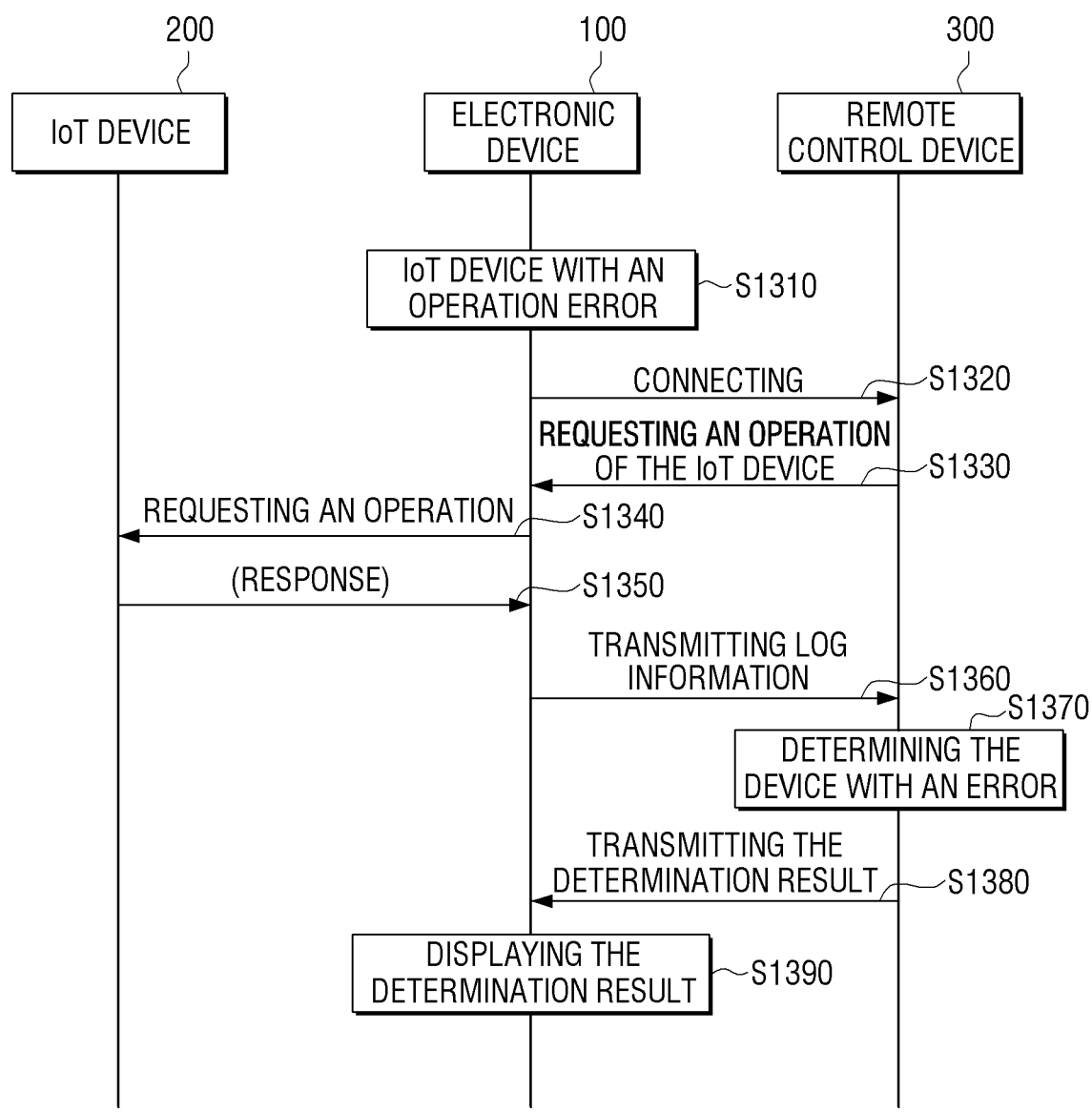
FIG. 13 is a sequence diagram for illustrating the example illustrated in FIG. 7.

FIG. 13 is a sequence diagram for illustrating the example illustrated in FIG. 7.

First, the electronic device 100 may detect an operation error of the IoT device 200 at operation S1310. This may be detected by using a sensor provided on the electronic device 100, or identified by a user with the naked eye.

Next, the electronic device 100 may be connected with the remote control device 300 at operation S1320. Specifically, in case a user who identified the operation error of the IoT device 200 accessed the service center, and agreed with connection of the remote control device 300 of the service center and the electronic device 100, the electronic device 100 and the remote control device 300 may be connected.

Then, the remote control device 300 may request an operation of the IoT device 200 at operation S1330. Specifically, the remote control device 300 may request the same operation as the operation wherein the operation error of the IoT device 200 was detected. Here, the remote control device 300 may request an operation for the IoT device 200 through the electronic device 100.

Then, the electronic device 100 may request an operation to the IoT device 200 according to the request received from the remote control device 300 at operation S1340. Next, the electronic device 100 may receive a response from the IoT device 200 at operation S1350. Meanwhile, in case there is a problem in the IoT device 200, a response may not be received.

Then, the electronic device 100 may transmit log information acquired based on the transmitted control command and the response thereto received to the remote control device 300 at operation S1360.

The remote control device 300 may identify the device wherein the error occurred based on the received log information at operation S1370. Specifically, the remote control device 300 may identify whether the cause of the operation error of the IoT device 200 is the IoT device 200 itself, or the electronic device 100 based on the log information.

Next, the remote control device 300 may transmit the identification result to the electronic device 100 at operation S1380. Then, the electronic device 100 may display the identification result received from the remote control device 300 at operation S1390.

According to the various embodiments of the disclosure as described above, the cause of an operation error of an IoT device can be identified in more detail, and thus confusion of a user can be prevented and fast restoration can be promoted. Also, by analyzing the cause of an operation error of an IoT device, a legal dispute that may occur later can be prevented beforehand, and even if a dispute occurred, evidence related to proof of responsibility can be secured in advance.

Meanwhile, the various embodiments described above may be implemented in a recording medium that can be read by a computer or a device similar to a computer, by using software, hardware, or a combination thereof. According to implementation by hardware, the embodiments described in the disclosure may be implemented by using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In some cases, the embodiments described in this specification may be implemented as the processor itself. Also, according to implementation by software, the embodiments such as procedures and functions described in this specification may be implemented as separate software modules. Each of the software modules may perform one or more functions and operations described in this specification.

Meanwhile, a method for controlling an electronic device according to the aforementioned various embodiments of the disclosure may be stored in a non-transitory readable medium. Such a non-transitory readable medium may be used while being installed on various devices.

A non-transitory readable medium refers to a medium that stores data semi-permanently, and is readable by machines, but not a medium that stores data for a short moment such as a register, a cache, and a memory. Specifically, programs for performing the aforementioned various methods may be provided while being stored in a non-transitory computer-readable medium such as a CD, a DVD, a hard disc, a blue-ray disc, a USB, a memory card, a ROM and the like.

According to an embodiment of the disclosure, methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: play store TM). In the case of on-line distribution, at least a portion of a computer program product may be stored in a storage medium such as the server of the manufacturer, the server of the application store, and the memory of the relay server at least temporarily, or may be generated temporarily.

Also, while preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. In addition, it is intended that such modifications are not to be interpreted independently from the technical idea or prospect of the disclosure.

What is claimed is:

1. An electronic device comprising:
    a communicator communicating with an Internet-of-Things (IoT) device through an IoT server;
    a memory storing at least one command; and
    a processor configured to:
    by executing the at least one command, control the communicator to transmit a control command for controlling the IoT device, and control the communicator to acquire log information relating to transmission of the control command and a response received for the control command, and transmit the acquired log information to an external device,
    wherein the log information includes log information for the control command transmitted to the IoT server through the communicator, log information for the control command transmitted from the IoT server to the IoT device, log information for a response for the control command transmitted from the IoT device to the IoT server, and log information for the response received from the IoT server through the communicator.

2. The electronic device of claim 1,
    wherein the external device includes a remote control server or an external storage device, and
    the processor is configured to:
    based on an operation error of the IoT device occurring, control the communicator to transmit the log information to the remote control server or the external storage device.

3. The electronic device of claim 1,
    wherein the processor is configured to:
    based on an operation error of the IoT device occurring, store the log information in the memory.

4. The electronic device of claim 1,
    wherein the processor is configured to:
    based on an operation error of the IoT device occurring, identify a device wherein the error occurred among the electronic device, the IoT server, and the IoT device based on the log information.

5. The electronic device of claim 4,
    wherein the processor is configured to:
    based on receiving log information for the response from the IoT server, identify that an error occurred in the electronic device, and
    based on failing to receive log information for the response from the IoT server within a predetermined time after transmitting the control command, identify that an error occurred in the IoT device.

6. The electronic device of claim 4, further comprising:
    a display,
    wherein the processor is configured to:
    control the display to display at least one of information on the device wherein the error occurred or information on a method to resolve the error.

7. A method for controlling an electronic device, the method comprising:
    transmitting a control command for controlling an Internet of Things (IoT) device to the IoT device through an IoT server;
    receiving a response for the control command;
    acquiring log information relating to transmission of the control command and the response; and
    transmitting the acquired log information to an external device,
    wherein the log information includes log information for the control command transmitted from the electronic device to the IoT server, log information for the control command transmitted from the IoT server to the IoT device, log information for a response for the control command transmitted from the IoT device to the IoT server, and log information for the response received from the IoT server.

8. The control method of claim 7,
    wherein the external device includes a remote control server or an external storage device, and the transmitting to the external device comprises:
based on an operation error of the IoT device occurring, transmitting the log information to the remote control server or the external storage device.

9. The control method of claim 7, further comprising:
based on an operation error of the IoT device occurring, storing the log information in the memory.

10. The control method of claim 7, further comprising:
based on an operation error of the IoT device occurring, identifying a device wherein the error occurred among the electronic device, the IoT server, and the IoT device based on the log information.

11. The control method of claim 10,
wherein the identifying comprises:
based on receiving log information for the response from the IoT server, identifying that an error occurred in the electronic device, and
based on failing to receive log information for the response from the IoT server within a predetermined time after transmitting the control command, identifying that an error occurred in the IoT device.

12. The control method of claim 10, further comprising:
displaying at least one of information on the device wherein the error occurred or information on a method to resolve the error.

* * * * *